United States Patent
Burse

(10) Patent No.: US 7,427,845 B2
(45) Date of Patent: Sep. 23, 2008

(54) SEGMENTED SWITCHED RELUCTANCE ELECTRIC MACHINE WITH INTERDIGITATED DISK-TYPE ROTOR AND STATOR CONSTRUCTION

(75) Inventor: Ronald Odell Burse, Ocean Springs, MS (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 11/511,980

(22) Filed: Aug. 29, 2006

(65) Prior Publication Data

US 2006/0290216 A1    Dec. 28, 2006

Related U.S. Application Data

(60) Continuation of application No. 11/150,777, filed on Jun. 10, 2005, now abandoned, which is a continuation-in-part of application No. 10/933,711, filed on Sep. 3, 2004, now abandoned, which is a continuation of application No. 10/459,358, filed on Jun. 11, 2003, now Pat. No. 6,803,847, which is a division of application No. 10/077,278, filed on Feb. 15, 2002, now Pat. No. 6,713,982.

(60) Provisional application No. 60/270,032, filed on Feb. 20, 2001.

(51) Int. Cl.
    *H02K 16/00* (2006.01)
(52) U.S. Cl. .................. 318/538; 310/114; 310/179; 310/268
(58) Field of Classification Search .......... 318/538; 310/114, 177–179, 254, 261, 268, 158
See application file for complete search history.

(56) References Cited

U.S. PATENT DOCUMENTS

| | | |
|---|---|---|
| 3,346,796 A | 10/1967 | Avey |
| 3,401,284 A | 9/1968 | French |
| 3,401,286 A | 9/1968 | French et al. |

(Continued)

FOREIGN PATENT DOCUMENTS

| | | | |
|---|---|---|---|
| GB | 2139821 A | 0/1884 | |

(Continued)

*Primary Examiner*—Bentsu Ro

(57) ABSTRACT

The present invention relates to a unipolar current electrical machine operable as a switched reluctance motor, comprising a motor structure and a control unit. The motor structure comprises a plurality of disk-shaped annular stator elements stacked and spaced equidistantly from each other and mounted on a frame; a plurality of disk-shaped rotor elements mounted on a rotational axis and spaced equidistantly from each other such that successive rotor elements are positioned between successive stator elements; a plurality of electrical windings on each of the stator elements, which when energized with a current flow, produce a magnetic field in a direction substantially parallel to the axis; and a return path for completing a magnetic flux path in a second direction perpendicular to the first direction on successive stator elements and through the rotor elements for generating a rotational force in the rotor elements; and a rotor position sensor. A rotor position sensor provides a signal to the control unit. The control unit utilizes an input signal in combination with the rotor position signal to switch current to each of the windings of the stator elements in a controlled manner.

15 Claims, 8 Drawing Sheets

U.S. PATENT DOCUMENTS

| | | |
|---|---|---|
| 3,401,287 A | 9/1968 | French et al. |
| 3,401,288 A | 9/1968 | French |
| 3,401,323 A | 9/1968 | French |
| 3,436,571 A | 4/1969 | Frech |
| 3,543,066 A | 11/1970 | French |
| 3,593,243 A | 7/1971 | Trump et al. |
| 3,691,494 A | 9/1972 | Okuyama |
| 3,700,944 A | 10/1972 | Heintz |
| 3,715,696 A | 2/1973 | Gearhart |
| 3,757,147 A | 9/1973 | Lyman, Jr. |
| 3,855,486 A | 12/1974 | Binder et al. |
| 3,902,146 A | 8/1975 | Muralidharan |
| 4,187,441 A | 2/1980 | Oney |
| 4,318,066 A | 3/1982 | Degeneff et al. |
| 4,371,801 A | 2/1983 | Richter |
| 4,691,133 A | 9/1987 | Mongeau |
| 4,874,974 A | 10/1989 | Wu |
| 4,996,457 A | 2/1991 | Hawsey et al. |
| 5,028,830 A | 7/1991 | Mas |
| 5,177,392 A | 1/1993 | Scott |
| 5,331,536 A | 7/1994 | Lane |
| 5,396,140 A | 3/1995 | Goldie et al. |
| 5,397,953 A | 3/1995 | Cho |
| 5,463,303 A | 10/1995 | Hall et al. |
| 5,642,009 A | 6/1997 | McCleer et al. |
| 5,726,615 A | 3/1998 | Bloom |
| 5,942,830 A | 8/1999 | Hill |
| 6,206,739 B1 | 3/2001 | Dadd et al. |
| 6,563,410 B1 | 5/2003 | Marton |
| 6,713,982 B2 | 3/2004 | Burse |
| 6,803,847 B2 | 10/2004 | Burse |
| 2005/0030142 A1 | 2/2005 | Burse |
| 2006/0038516 A1 | 2/2006 | Burse |

FOREIGN PATENT DOCUMENTS

| | | |
|---|---|---|
| GB | 2358740 A | 8/2001 |
| WO | WO9511514 A | 4/1995 |

SEGMENTED SWITCHED RELUCTANCE ELECTRIC MACHINE WITH INTERDIGITATED DISK-TYPE ROTOR AND STATOR CONSTRUCTION

CROSS REFERENCE TO RELATED APPLICATIONS

This application is a continuation of application Ser. No. 11/150,777, filed Jun. 10, 2005, now pending, which is continuation-in-part of application Ser. No. 10/933,711, filed Sep. 3, 2004, now abandoned, which is a continuation of application Ser. No. 10/459,358, filed Jun. 11, 2003, now U.S. Pat. No. 6,803,847 B2, which is a divisional application of application Ser. No. 10/077,278, filed Feb. 15, 2002, now U.S. Pat. No. 6,713,982 B2, which claims benefit of U.S. Provisional application 60/270,032, filed Feb. 20, 2001 which are all incorporated herein by reference in their entireties.

FIELD OF THE INVENTION

The present invention relates to a unipolar current electrical switched reluctance machine which uses a segmented coil construction to maximize active surface area of magnetic flux between rotor and stator elements, resulting in higher efficiency of flux utilization, to a method of operating such a machine in a fault tolerant manner and to a method of manufacture of such a machine. In contrast with induction motors, which utilize alternating current, a switched reluctance machine operates with a unipolar current flowing through its coils.

BACKGROUND OF THE INVENTION

Electric machines such as motors and generators, are generally used because they are extremely rugged, reliable, easy to control, and in particular have a high torque capacity and high power density ratings. Switched reluctance machines operate on the principle that current traveling in stationary coils or windings of a stator produces a rotating magnetic field which in turn interacts with a rotor occupying the space where the rotating magnetic field exists. The magnetic teeth of the rotor react with the rotating magnetic field to produce a rotational force.

Heretofore, it was believed that there was a fundamental limit to torque density in such machines. Although flux density is limited by material considerations, while current density is limited by (1) heating, (2) machine reactance, and (3) the fact that too much current density produces localized magnetic saturation, the present invention optimizes the configuration of the rotor and stator elements so that the machine output can be increased without substantially increasing the volume of the machine. Conventional belief in the design of electric machines is that power density is limited and the only way to increase power output is to increase the volume of the machine.

Switched reluctance motors operate on the principle of unipolar current, i.e., the current flows only in one direction in the windings regardless of whether positive or negative torque is required. This principle requires only one switch to be in series with each winding in each stator element. The turning on or off of this switch regulates the flow of current in the winding. It should be noted that in the motor literature an individual winding of a stator element is sometimes generally referred to as a "phase". In the context of a unipolar current electrical machine the term "phase" is somewhat analogous to a phase of a multiphase alternating current motor.

The primary object of this invention is to provide a switched reluctance electrical machine having a high torque capacity for a given machine volume. A second object of this invention is to provide such a switched reluctance electrical machine in which the commonly accepted limit to torque density in electrical machines is overcome by utilizing the same magnetic flux among one or more parallel air gaps. A third object of this invention is to provide a switched reluctance electrical machine in which the magnetic flux is passed through multiple air gaps, interacting with a rotor element at each air gap, thereby increasing the torque density for a give volume of the machine. A fourth object of this invention to provide such an electrical machine in which force density is increased substantially by the number of air gaps present in the machine but the overall machine transverse dimension is increased only by a smaller factor because the magnetic return path remains nearly constant. A fifth object of this invention is to provide a fault tolerant switched reluctance electrical machine which can continue to operate even when one or more winding faults have been detected. A sixth object of this invention is to provide a method of manufacture for such a switched reluctance electrical machine.

BRIEF SUMMARY OF THE INVENTION

The present invention is a unipolar current electrical machine having a housing, a stator mounted in the housing, and a rotor, the rotor having a shaft with an axis therethrough and being supported by bearings for rotation about the axis in the housing, comprising:

the stator having a plurality of stator elements each in the form of an annular disk, spaced apart from each other, each stator element comprising a plurality of magnetically isolated magnetic teeth;

a plurality of electrical windings on each of the stator elements, each winding being associated with a group of magnetic teeth of the stator element, each group of magnetic teeth being arranged at a predetermined angular position with respect to an adjacent group of magnetic teeth, each of the windings being arranged such that, when energized with a current flowing in the windings, a magnetic flux is created in a first direction;

the rotor having a plurality of rotor elements, the rotor elements being spaced from each other and interstitially disposed with the stator elements in an interdigitated manner;

each rotor element being in the form of a circular disk mounted on the shaft, each rotor element comprising a plurality of magnetically isolated magnetic teeth arranged in an annular portion of the circular disk;

means for completing a magnetic flux path in a second direction through the magnetic teeth of the rotor elements and through corresponding groups of teeth on successive stator elements.

The present invention further comprises a modular control unit arranged to individually control electrical energy applied to each winding of each stator element, the control unit comprising:

(a) a microprocessor controller, a load sensing means, a rotor angle position sensor, and a plurality of stator control modules, each control module comprising an electrical switching device connected to a winding of the respective stator element; the microprocessor controller being responsive to the load sensing means and to the rotor angle position sensor to generate control signals to the control modules, each control module being responsive to the control signals to control the flow of current to the connected winding of the stator element in a pulse-width control manner, the flow of current to each winding being turned on at a first predetermined rotor angle position and turned off at a second predetermined rotor angle position by the control unit in response to control signals from the controller, thus causing the rotor to rotate at a speed responsive to the control signals with a power output proportional to the load.

In the present invention each control module may further comprise current sensing means to sense current in the windings of the associated stator element and means to generate a corresponding signal to the microprocessor controller, the controller being responsive to the signal to compensate for the sensed current and to generate control signals to the control modules to equalize the current in each phase of the stator windings.

In the control unit of the present invention, the microprocessor controller compares each current signal to a predetermined fault threshold to detect a winding fault and then causes that control module to deenergize one or more windings of the stator element in response to the detected fault, permitting the motor to continue to operate. Alternatively, the controller may cause the control modules to deenergize all the windings in a stator element is response to a detected fault.

In the present invention the load sensing means may comprise a motor speed sensor or a torque sensor.

The present invention also comprises a method of operating a unipolar electrical machine, as described above, in a fault tolerant manner in response to a controller, the controller being responsive to the load sensing means, the rotor angle position sensing means, and the signal representing the sensed winding current, to generate control signals to the control modules;

the controller comparing each current signal to a predetermined fault threshold to detect a fault in a winding in a stator element and causing the corresponding control module to deenergize one or more windings in the stator element in response to the detected fault, thereby permitting the motor to continue to operate in the presence of a winding fault.

BRIEF DESCRIPTION OF THE DRAWING(S)

Figure 5A:
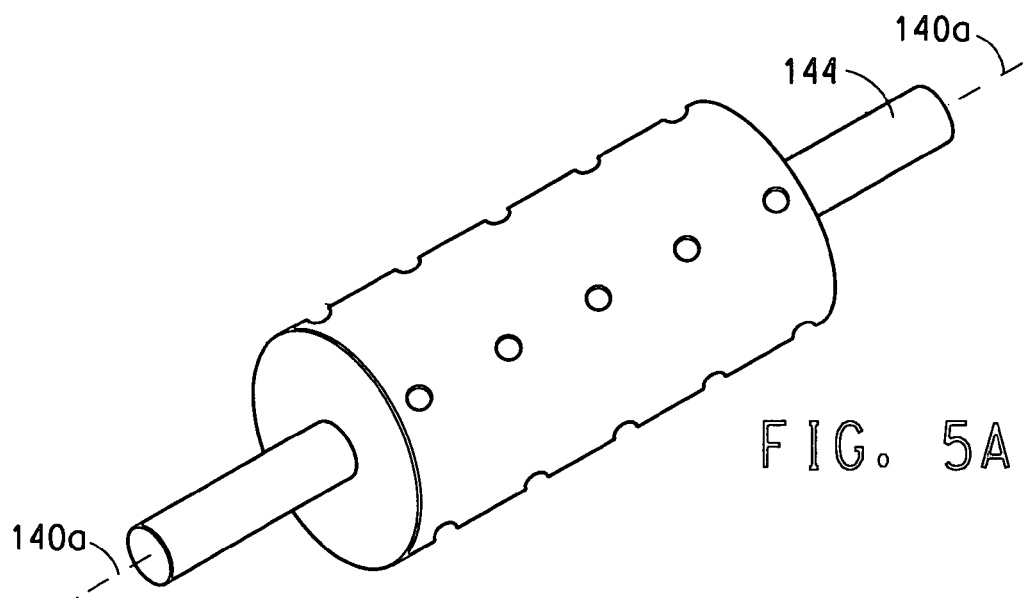
Figure 6:
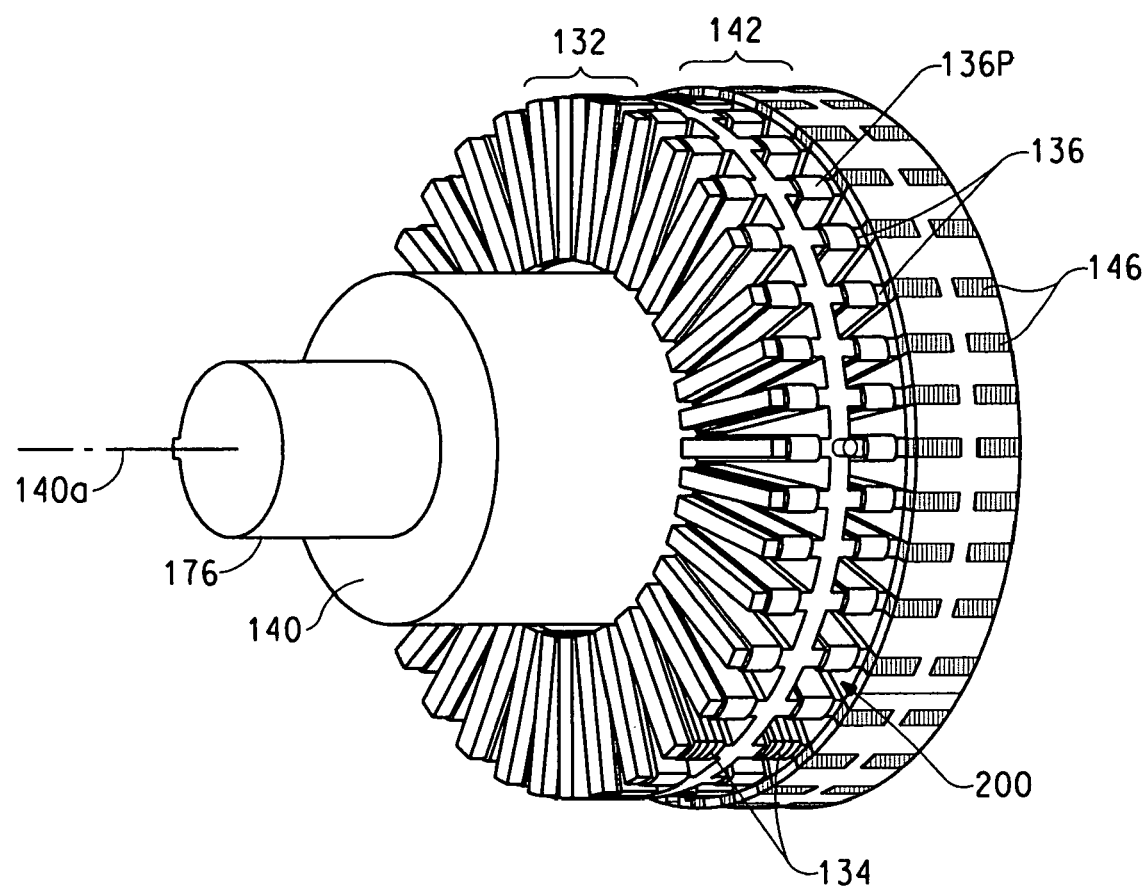
Figure 7:
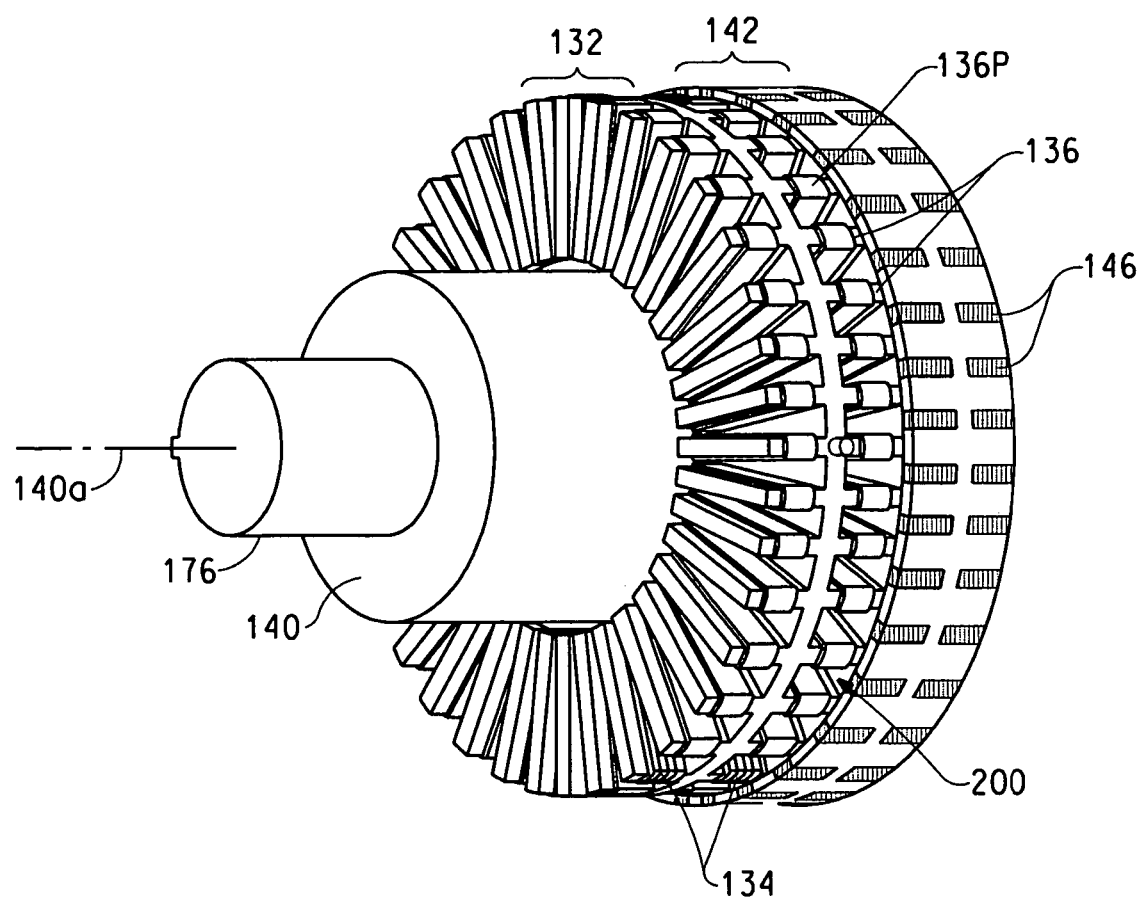
Figure 8:
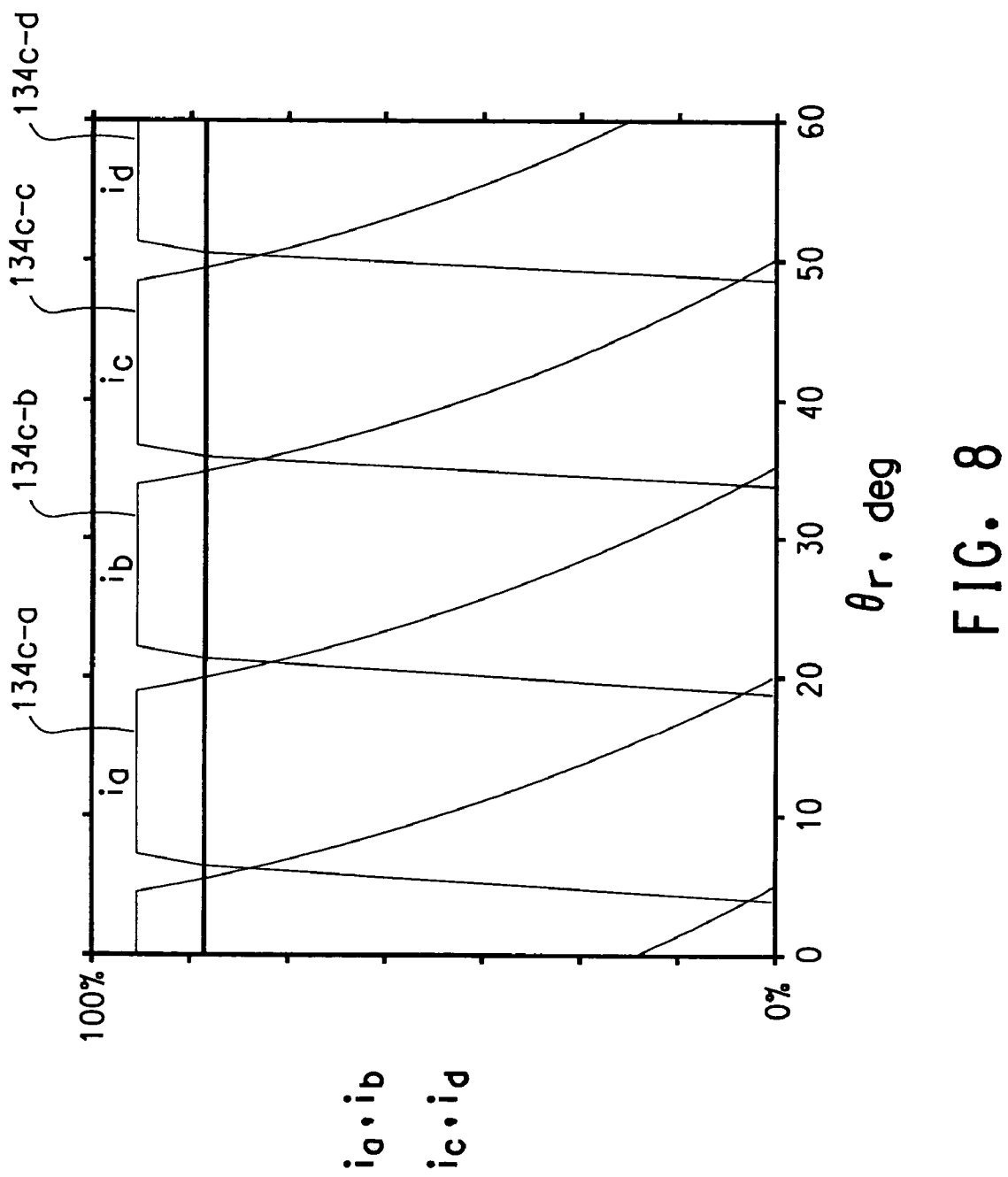

FIGS. 5A, B and C show an exemplary arrangement of a rotor element construction of the present invention;

FIG. 6 shows a view with the magnetic teeth of the stator elements and the magnetic teeth of the rotor elements misaligned;

FIG. 7 shows a view with the magnetic teeth of the stator elements and the magnetic teeth of the rotor elements aligned; and FIG. 8 shows a plot of winding current versus rotor position angle for a four-phase switched reluctance motor.

DETAILED DESCRIPTION OF THE INVENTION

The present invention is exemplified by the Figures. As may be seen in FIG. 1, the electrical machine 100 the present invention comprises a motor unit 110 and a modular control unit 160. The motor unit 110 (best seen in FIG. 2) comprises a housing 120, a stator 130 mounted in the housing, and a rotor 140, the rotor 140 having an axis 140A therethrough and being supported in the housing 120 by bearings 122 for rotation about the axis 140A. The housing 120 oprionall may have air vents 124 or heat radiating ribs 126. The stator 130 has a plurality of stator elements 132 in the form of annular disks 132D (best seen in FIGS. 3 and 4), spaced apart from each other, each stator element 132 comprising a plurality of magnetically isolated magnetic teeth 136 (FIGS. 3 and 4).

Figure 2:
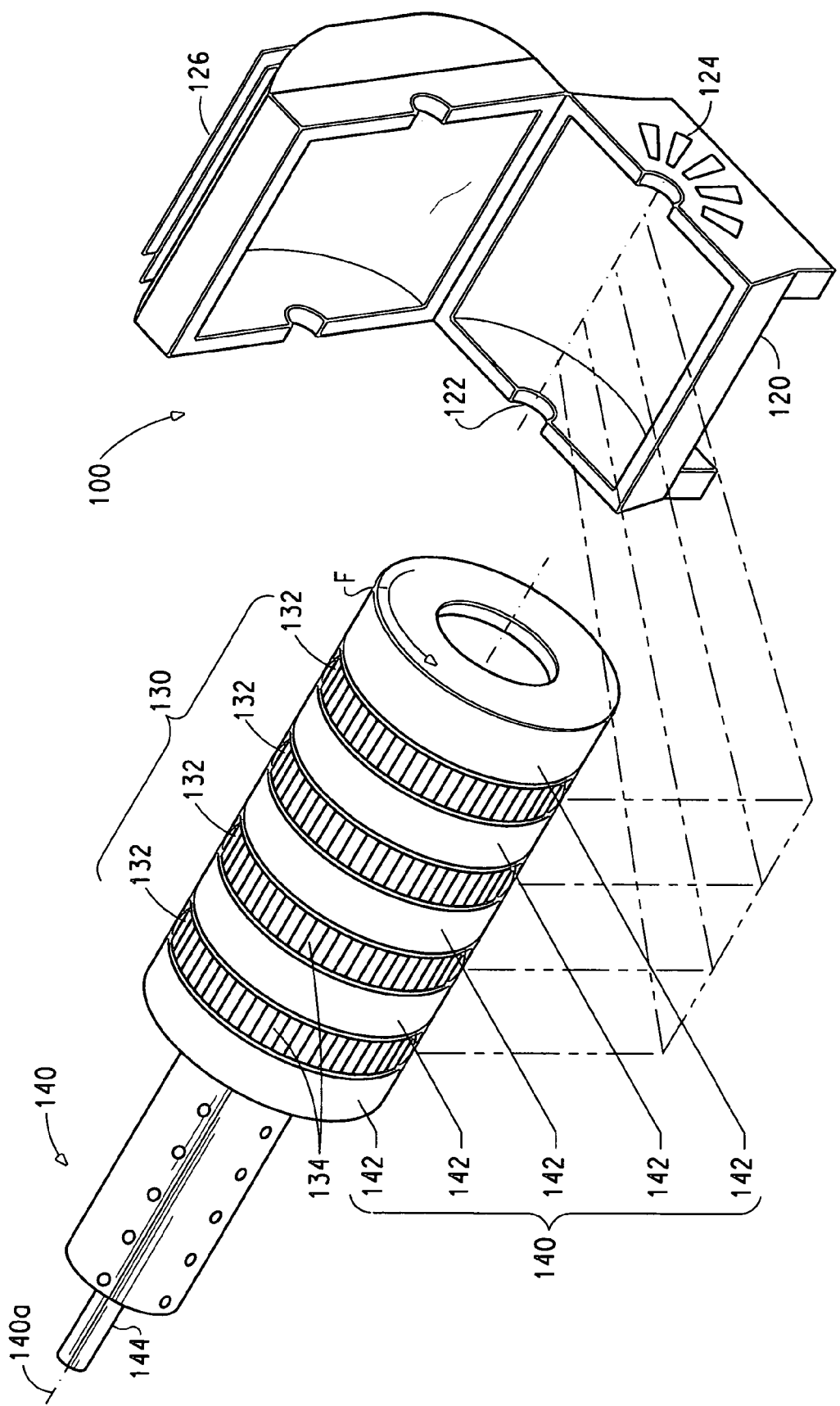
FIG. 2 shows a representative assembly overview of shaft, rotor disks, stators and housing of the present invention.

The rotor 140 has a plurality of rotor elements 142 (FIGS. 5A, 5B, 5C) mounted on a shaft 144, the rotor elements 142 being spaced from each other and interstitially disposed with the stator elements 132 in an interdigitated manner (FIG. 2).

Figure 3:
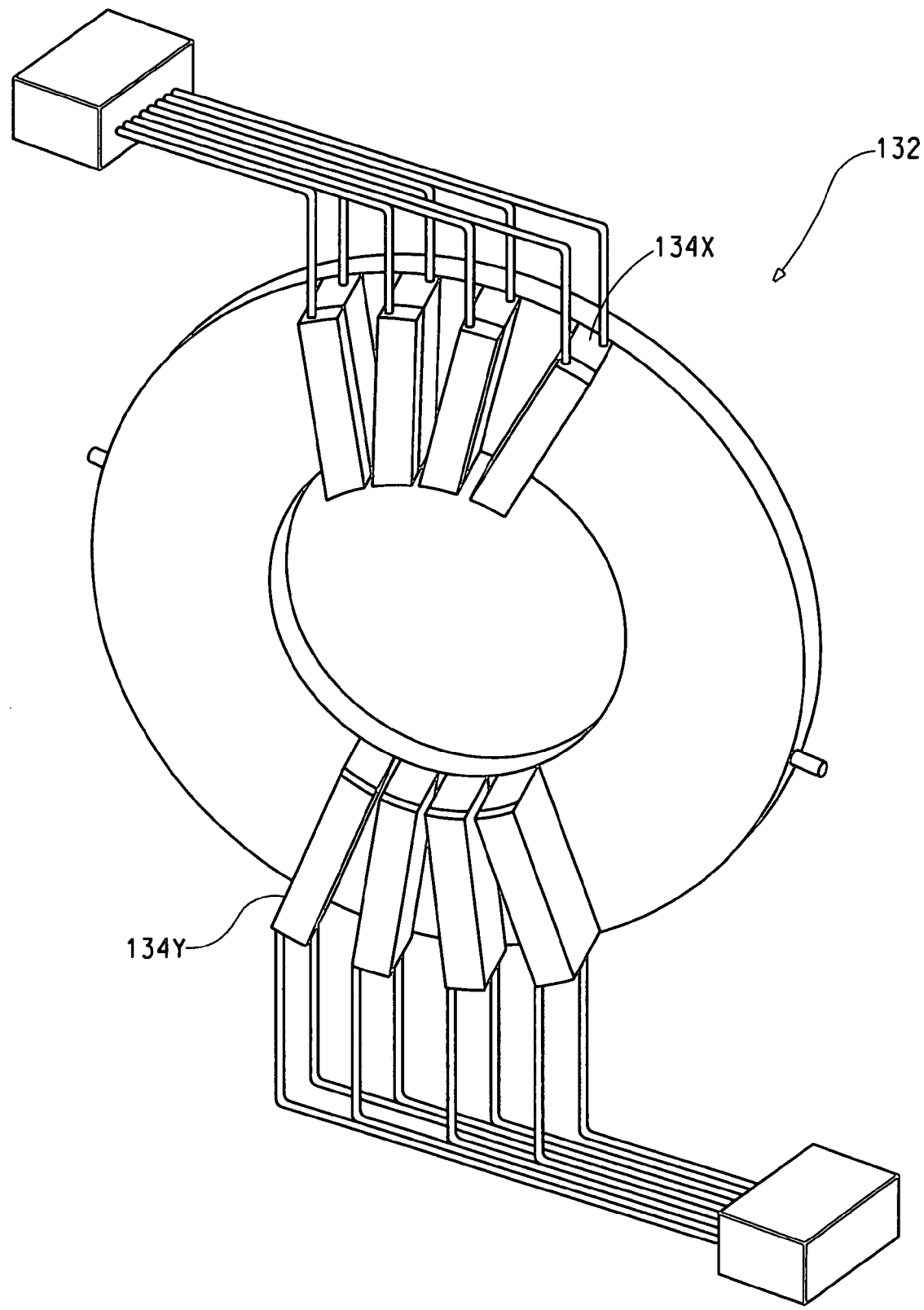
FIG. 3 shows a segmented stator construction of the present invention, showing only a portion of the stator windings, the windings surrounding individual magnetic teeth.
Figure 4:
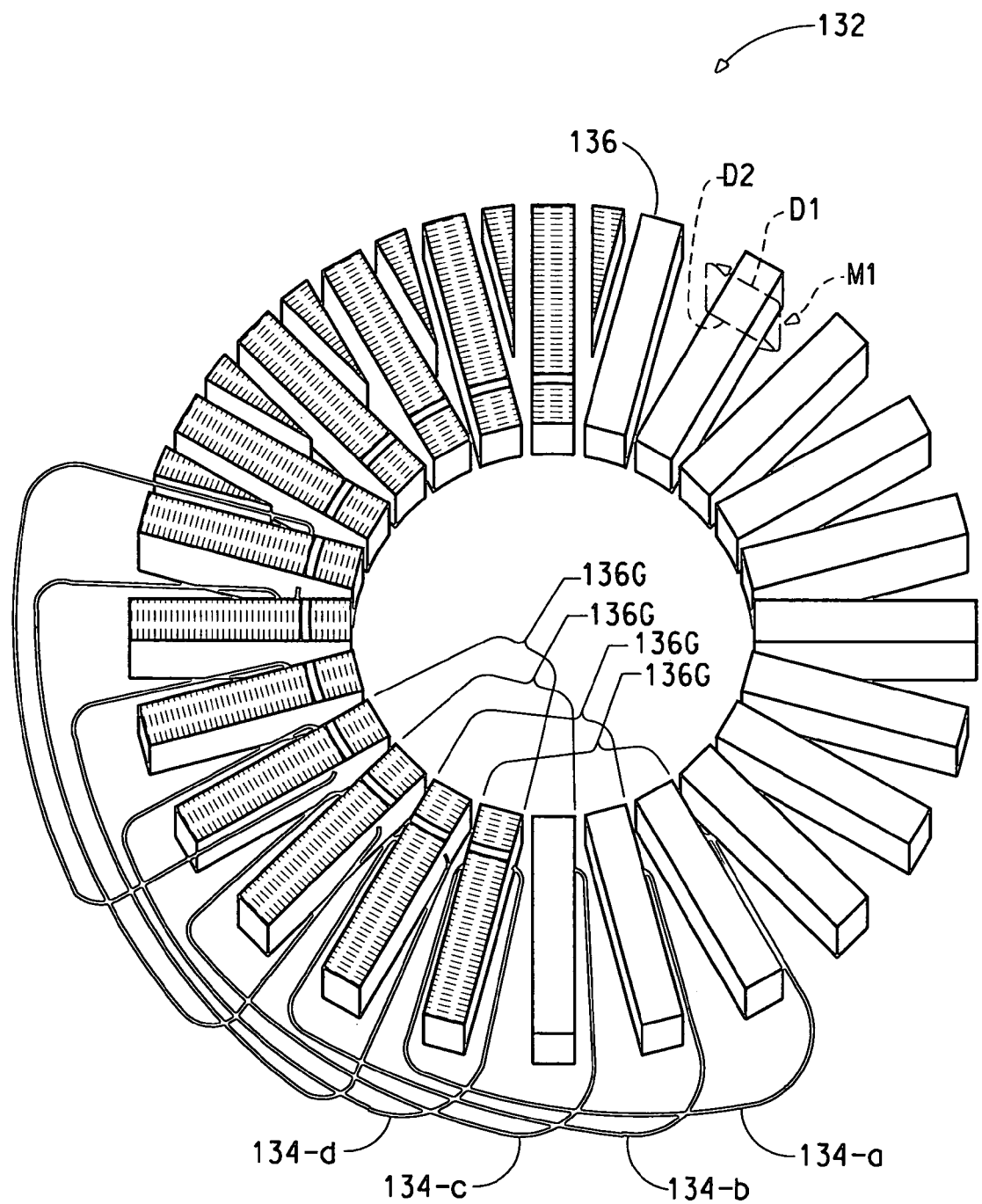
FIG. 4 shows an exemplary arrangement of a stator element construction of the present invention with the windings surrounding groups of magnetic teeth.

As may best be seen in FIG. 3, in a first arrangement, each of the stator elements 132 has a plurality of electrical windings 134, each winding 134 being associated with a magnetic tooth 136 of the stator element 132. As may best be seen in FIG. 4, in a second arrangement, each of the stator elements 132 has a plurality of electrical windings 134, each winding 134 being associated with a group 136G of magnetic teeth 136 of the stator element 132, the windings 134 being arranged such that, when energized with a current 134C flowing in the windings 134, a magnetic flux $M_1$ is created in a first direction $D_1$. It should be noted that some of the stator element components have been omitted so that the windings 134 may be better seen. Although the Figures illustrate an electrical machine having four windings 134-$a$, 134-$b$, 134-$c$, 134-$d$ in each stator element 132, the machine of the present invention may have any desired number of windings 134 in each stator element 132.

The magnetic flux path is completed in a second direction $D_2$ through corresponding groups 136G of teeth 136 on successive stator elements 132, and through the rotor elements 142, thereby resulting in a rotational force F being applied to the rotor elements 142 causing the rotor 140 to rotate as shown in FIG. 2.

Figure 1:
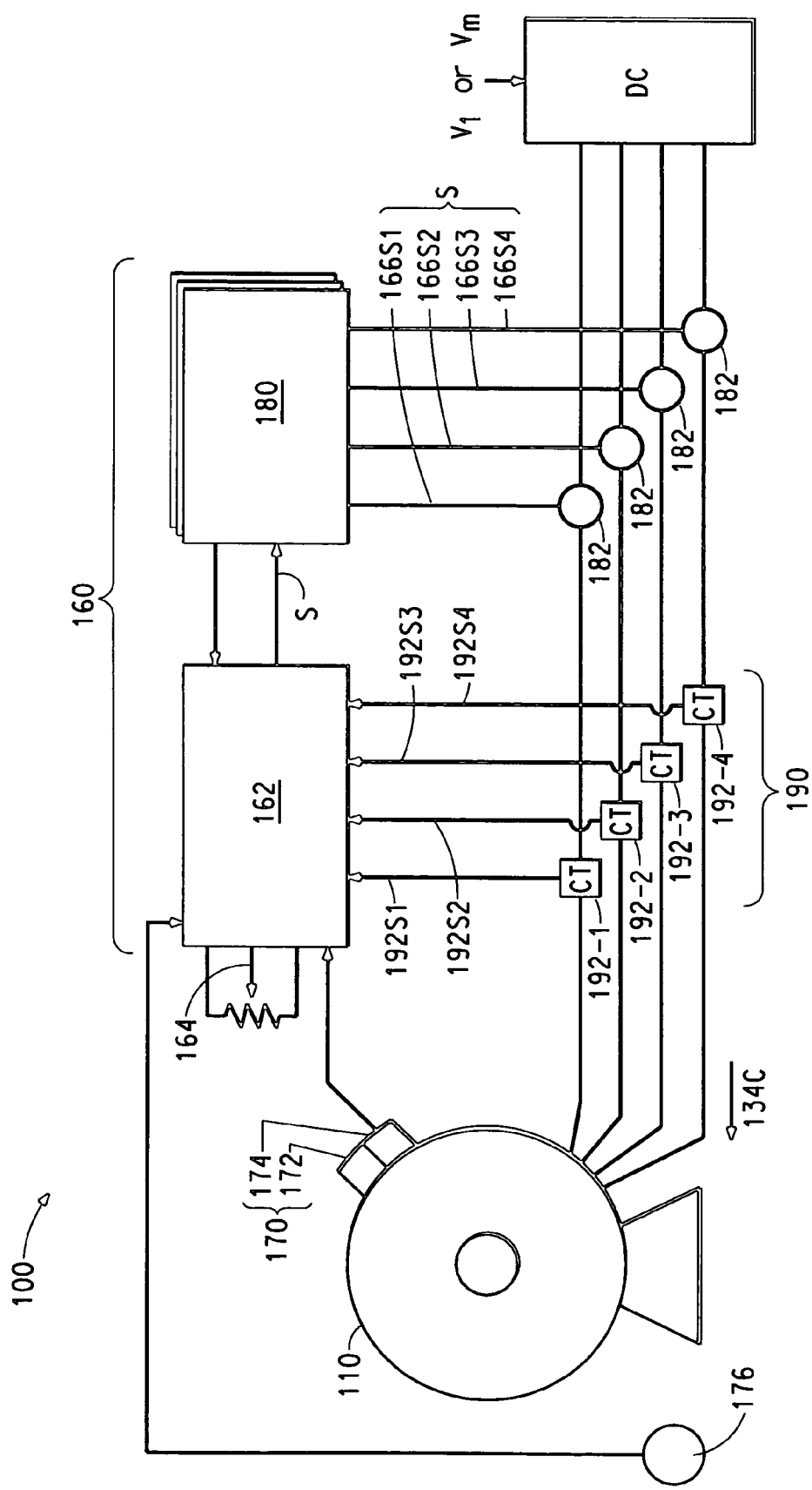
FIG. 1 shows an arrangement of components for a motor of the present invention.

As seen in FIG. 1, the electrical machine 100 further comprises a modular control unit 160 arranged to individually control electrical energy applied to each winding 134 of each stator element 132. The control unit 160 comprises a microprocessor controller 162, a load sensing means 170, a rotor position sensor 176 and a plurality of stator control modules 180.

Each control module 180 comprises a plurality of electrical switching devices 182 connected to the respective winding 134 of a stator element 132. Suitable electrical switching devices 182 include isolated gate bias transistors (IGBT) and similar devices capable of switching the required current. The microprocessor controller 162 is responsive to the load sensing means 170 and the rotor position sensor 176 to generate control signals S to the control modules 180. The load sensing means 170 may comprise a motor speed sensor 172 or a torque sensor 174. Each control module 180 is responsive to the control signals S to control the flow of current 134C to the connected winding 134 of stator element 132 in a pulse-width control manner by turning on and off the electrical switching devices 182, thus causing the rotor 140 to rotate at a desired speed with a desired power output proportional to the load.

The rotor angle position sensor 176 is typically implemented by an optical encoder. Rotor shaft position feedback is needed to synchronize the current flow in each winding 134 with rotor position in order to generate the desired motoring torque. The rotor angle position is also used by the controller 162 to compute actual rotor rotational speed, which is compared with the desired speed and used to control the rotor rotational speed.

Each control module 180 further comprises current sensing means 190 to sense current 134C in the windings 134 of the associated stator element 132 and current signaling means 192 to generate a corresponding signal 192S to the microprocessor controller 162, the controller being responsive to the signal 192S to generate control signal S to the control modules 80, which in turn generate signals 166S1, 166S2, 166S3, 166S4 to the switching devices 82 to equalize the current 134C-a, 134C-b, 134C-c, 134C-d in each phase of the stator windings 134.

The microprocessor controller 162 compares each current signal 192S to a predetermined fault threshold 164F (schematically represented as being supplied by potentiometer 164) to detect a winding fault. When a winding fault is detected the microprocessor controller 162 sends a control signal S to that control module 180 which in turn generate signals 166S1, 166S2, 166S3, 166S4 to the switching devices 82 to deenergize one or more windings 134 of stator element 132 in response to the detected fault, permitting the motor 100 to continue to operate.

The power supplied to the control module 180 is direct current (i.e., is unipolar). The direct current may be supplied by any suitable direct current source, such as a DC power supply having a conventional rectifier, filter and voltage regulation means. The DC power supply may be fed from a single phase AC powerline source $V_1$ or from a multiphase AC source $V_M$.

The electrical machine of the present invention may have any desired number of windings 134 in each stator element 132. An exemplary embodiment having four windings (i.e., four phases) 134-a, 134-b, 134-c, 134-d is shown. When multiple windings 134 are employed the current sensing means 190 is arranged to sense current 134C in each individual winding (phase) 134-a, 134-b, 134-c, 134-d in each stator element 132. Signal generating means 192-a, 192-b, 192-c, 192-d generate corresponding sensing signals 192S1, 192S2, 192S3, 192S4 to the microprocessor controller 162. The controller 162 is responsive to each sensing signal 192S1, 192S2, 192S3, 192S4 to generate control signal S (which may comprise components 166S1, 166S2, 166S3, 166S4) to the control modules 180 to equalize the currents 134C-a, 134C-b, 134C-c, 134C-d in each of the stator windings 134-a, 134-b, 134-c, 134-d.

The microprocessor controller 162 compares each current sensing signal 192S1, 192S2, 192S3, 192S4 from each winding 134 in each stator element 132 to a predetermined fault threshold 164F to detect a winding fault in a stator element 132, and causes the control module 180 connected to that stator element 132 to deenergize one or more windings 134 of that stator element 132 in response to the detected fault, permitting the motor 100 to continue to operate.

The microprocessor controller 162 may respond to the sensed current in the faulted winding 134 in a number of ways. The microprocessor controller 162 may increase the current in the other windings 134 of that stator element 132 to compensate for the fault. Alternatively, the microprocessor controller 162 may respond to the sensed current in the faulted winding 134 to increase the current in the windings 134 of other stator elements 132 not having the faulted winding 134 to compensate for the fault. In response to a fault at least two windings 134 in a stator element 132 may be deenergized, the deenergized windings 134 being symmetrically arranged on the stator element 132, so that torque produced by that stator element fluctuates in a symmetrical manner.

When one or more windings in a stator element 132 not containing the faulted winding 134 are deenergized, those deenergized windings are arranged on the unfaulted stator element rotationally symmetrical to the faulted winding 134 on the faulted stator element 132, so that torque produced by the electrical machine remains substantially constant.

A unipolar electrical machine operated as a switched reluctance motor is a singly-excited motor with salient poles 136P on the stator 130 (FIGS. 6 and 7) and salient poles 146P on the rotor 140 (FIGS. 6 and 7). Only the stator 130 carries windings 134 on the stator elements 132. The rotor 140 has neither windings nor magnets and is built up from a stack of steel laminations. Each stator winding 134 (phase) consists of two series connected windings 134X, 134Y (FIG. 3) on diametrically opposite magnetic teeth 136 to create magnetic poles. Alternatively, stator winding may consist of windings that are wound around groups 136G of magnetic teeth 136 (FIG. 4).

In a switched reluctance motor torque is produced by the tendency of its moveable part (i.e., rotor 140) to move to a position where the inductance of the excited winding 134 of the stator element 132 is maximized. During motor operation, each winding 134 of the stator element 132 is excited (i.e., current is turned on) when its inductance is increasing, and unexcited (i.e., current is turned off) when its inductance is decreasing. The air gap 200 (FIGS. 6 and 7) is at a minimum at the aligned position, the position where a pair of rotor poles is exactly aligned with a stator pole as seen in FIG. 7, and the magnetic reluctance of the flux flow is at its lowest. The magnetic reluctance will be highest at the unaligned position as seen in FIG. 6. Thus, when a winding 134 of the stator element 132 is energized a magnetic pole on the stator is created. If a magnetic tooth 146 on the rotor 140 is not aligned with that magnetic stator pole 136P created by the current in the winding 134 around magnetic tooth 136, the rotor 140 will start to move and attempt to align with the stator pole 136P. If the rotor position is known (as sensed by rotor angle position sensor 176) the current to successive stator windings 134 may be switched on and off in a controlled manner, causing the rotor 140 to rotate in a desired direction and at a desired speed.

The controller 162 implements conventional switched reluctance motor torque, speed and position control protocols (i.e., current or torque method control) with control of control modules 180 connected to individual windings 134 of the segmented stator elements 132. Combined with current sensing inputs 192S the control unit therefore implements a self-regulating variable power output device.

Operation of a Four-Phase Switched Reluctance Motor

Since switched reluctance motors operate on the principle of unipolar current, i.e., the current flows only in one direction in the windings 134 regardless of whether positive or negative torque is required. This principle requires only one switch 182 to be in series with each phase winding 134. The turning on or off of this switch 182 regulates the flow of current 134C in the phase winding 134. The exemplary four-phase construction, where the phases are identified respectively as: a, b, c, d, when operating, has phase currents 134C-a, 134C-b, 134C-c, 134C-d plotted as shown in FIG. 8 (lines $i_a$, $i_b$, $i_c$, $i_d$ respectively).

As seen in FIGS. 3, 4, 6 and 7, there are a plurality of magnetically isolated magnetic teeth 136 on each of the stator elements 132. There are a plurality of electrical windings 134 on each stator element 132. Each of the windings 134 surrounds a different group 136G of magnetic teeth 136 to create a magnetic pole 136P. There are also return means including magnetic material for establishing a magnetic flux path axially in series through corresponding groups of teeth 136 on successive stator elements 132 and teeth 146 on the interstitial rotor elements 142, and azimuthally in the return means.

The number of teeth 146 on each rotor element 142 may be the same as or different in number from the number of teeth 136 on each stator element 132. There are return means including magnetic material for establishing a low reluctance azimuthal flux path and a plurality of conductor paths surrounding the teeth on each of the rotors. In a preferred embodiment the stator elements 132 are each in the form of an annular disk 132D. The magnetic teeth 136 of the stator elements 132 are imbedded in the annular disks 132D, and the annular disks 132D are of laminated construction.

Figure 5B:
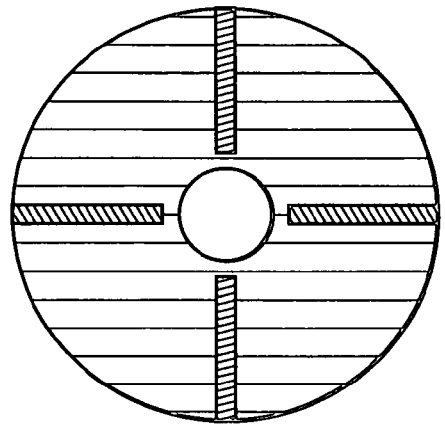
Figure 5C:
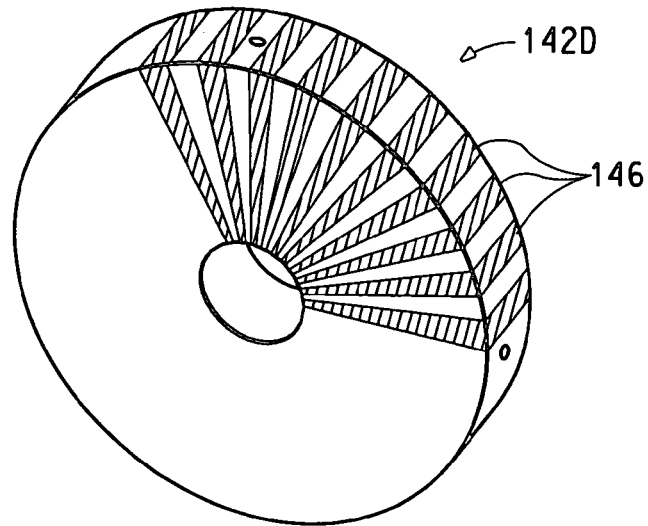

FIGS. 5A, 5B and 5C show a preferred embodiment of the rotor elements 142, which are each in the form of a circular disk 142D mounted on the shaft 144. In a similar manner the magnetic teeth 146 of the rotor elements 142 are imbedded in the circular disks 142D, and the circular disks 142D are of laminated construction.

In the unipolar current electrical machine of the present invention materials of construction known and used in conventional designs of motors, generators, transformers and the like may be used. In the present invention the various control means and electrical components for control may be assembled from electrical components known and used in conventional electrical control circuits. For example, the load sensing means 170 (FIG. 1) may be a conventional load or torque sensor and the current sensing means 190 may be a plurality of control transformers (CT).

In the present invention, the specific geometric relationship of the rotor and stator elements according to the present invention is unique. This unique segmented geometry not only provides advantages in the efficiencies of operation, but also results in a surprising ease of manufacturing and interchangeability electrical components.

The present invention provides a method of manufacture of a unipolar current electrical machine having a housing, a stator mounted in the housing, and a rotor, the rotor having a shaft with an axis therethrough and being supported by bearings for rotation about the axis in the housing, the method comprising the steps of:

(a) selecting from a plurality of individual stator elements the number of stator elements necessary to produce the desired horsepower or kilowatt rating for the electrical machine wherein stator elements are in the form of annular disks comprising a plurality of magnetically isolated magnetic teeth, each stator element having thereon a plurality of electrical windings on each of the stator elements, each winding being associated with a group of magnetic teeth of the stator element, the windings being arranged such that, when energized with a current flowing in the windings, a magnetic flux is created in a first direction;

(b) selecting from a plurality of individual rotor elements necessary to produce the desired horsepower or kilowatt rating for the electrical machine, wherein the rotor elements are in the form of circular disks comprising a plurality of magnetically isolated magnetic teeth arranged in an annular portion of the circular disks;

(c) mounting the selected stator elements in the housing such that the elements are spaced apart from each other;

(d) mounting the selected rotor elements on the shaft such that the rotor elements are spaced from each other and interstitially disposed with the stator elements in an interdigitated manner, so that a magnetic flux path in a second direction is completed through corresponding groups of teeth on the rotor elements and through corresponding groups of teeth on successive stator elements.

Stator and rotor element combinations according to the present invention may be produced in selected sizes, for example 2, 5, 10 or 20 horsepower. To build a 40 horsepower motor, for example, one could select and stack two 20 horsepower stator rotor combinations, four 10 horsepower combinations, eight 5 horsepower combinations, or twenty 2 horsepower combinations.

This ability to combine combinations of simple elements or segments simplifies the manufacturing process. Motors may be produced in an assembly line operation rather than by custom manufacture. Repairs are also simplified. For example, a motor may be repaired by simply replacing a bad stator or rotor element with a good one. Field repairs may be possible in many situations. Parts inventories are simplified by the present invention in that simple stock parts can be manufactured and selected in combinations to produce the desired power output in a particular electrical machine.

The present invention is a unipolar current electrical machine having a novel arrangement of rotor and stator to produce increased torque compared to a conventional machine design, yet in a machine that is smaller in size than a conventional machines. It is believed that this increase in output/decrease in size is accomplished by passing the same magnetic flux created by the stator through multiple air gaps and interacting the magnetic flux at each gap with an adjacent rotor element, so that the force density is multiplied by the number of gaps.

The present invention is believed to offer the following advantages over conventional designs:

(1) Improved efficiency: The power output is maximized by optimizing the cross-sectional area of magnetic flux interaction between the stator and the rotor. This results in an increase of magnetic energy transfer and improved efficiency compared to conventional machines. Due to the increased magnetic energy transfer, less electrical power will be required to produce the same amount of mechanical power compared to prior art machines. Unlike prior art designs, the present invention utilizes independent stator elements and a split motor housing design, allowing individual segments of the stator to be removed and replaced, facilitating easier maintenance.

(2) Enhanced Control Capability: The motor design includes an integral microprocessor-based control unit that allows control of each individual winding of each stator element. This feature allows the motor to run at a constant speed with the optimal horsepower rating for a given load. Motor locked-rotor and in-rush currents are reduced compared to conventional designs. Due to the utilization of the individual stator element control, the motor can be started at a lower power rating, resulting in further reduction of locked-rotor and in-rush currents.

(3) Reductions in Size, Weight and Cost: The machine of the present invention can be smaller than conventional motors of an equivalent horsepower rating. The segmented design permits the manufacture of standardized modules of stator elements and rotor elements. By varying the number of modules which are assembled, machines of various sizes and power ratings may be achieved. The manufacture of interchangeable modules can reduce costs.

Those skilled in the art, having the benefits of the teachings of the present invention as hereinabove set forth, may effect numerous modifications thereto. Such modifications are to be construed as lying within the contemplation of the present invention, as defined by the appended claims.

What is claimed is:

1. An unipolar current electrical machine having a housing, a stator mounted in the housing, and a rotor, the rotor having a shaft with an axis therethrough and being supported by bearings for rotation about the axis in the housing, comprising:

the stator having a plurality of stator elements each in the form of an annular disk, spaced apart from each other, each stator element comprising a plurality of magnetically isolated magnetic teeth;

a plurality of electrical windings on each of the stator elements, each winding being associated with a group of magnetic teeth of the stator element, each group of magnetic teeth being arranged at a predetermined angular position with respect to an adjacent group of magnetic teeth, each of the windings being arranged such that, when energized with a current flowing in the windings, a magnetic flux is created in a first direction;

the rotor having a plurality of rotor elements, the rotor elements being spaced from each other and interstitially disposed with me stator elements in an interdigitated manner;

each rotor element being in the form of a circular disk mounted on the shaft, each rotor element comprising a plurality of magnetically isolated magnetic teeth arranged in a annular portion of the circular disk;

means for completing a magnetic flux path in a second direction through the magnetic teeth of the rotor elements and through corresponding groups of teeth on successive stator elements;

a modular control unit arranged to individually control electrical energy applied to each winding of each stator element, the control unit comprising:

a microprocessor controller, a load sensing means, a rotor angle position sensor, and a plurality of stator control modules, each associated with a respective stator element, each stator control module comprising a plurality of electrical switching devices, each connected to a winding of the respective stator element;

the microprocessor controller being responsive to the load sensing means and the rotor angle position sensor to generate control signals to the control modules;

each control module being responsive to the control signals to control the flow of current to each connected winding of the stator element in a pulse-width control manner, the flow of current to each winding being turned on at a first predetermined rotor angle position and turned off at a second predetermined rotor angle position by the control unit in response to control signals from the controller load sensing means and a current sensing means, thus causing the rotor to rotate at a speed and rotational direction responsive to the control signals, with a power output proportional to the load.

2. The electrical machine of claim 1, each control module further comprising current sensing means to sense current in each winding of the associated stator element and means to generate a corresponding signal to the microprocessor controller, the controller being responsive to the signal to compensate for the sensed current.

3. The electrical machine of claim 2, the microprocessor controller comparing each current signal to a predetermined fault threshold to detect a winding fault in a stator element and to cause that control module to deenergize one or more windings in the stator element in response to the detected fault, permitting the motor to continue to operate.

4. The electrical machine of claim 3, the microprocessor controller, in response to the detected fault, to cause the control modules corresponding to other stator elements not having the winding fault to increase current in the windings of those stator elements, permitting the motor to continue to operate at the desired speed and power output.

5. The electrical machine of claim 2, wherein the unipolar current is supplied from a control unit having multiple phase outputs, each output connected to a corresponding winding, the current sensing means being arranged to sense current in each individual winding in each stator element winding, means to generate a corresponding sensed current signal to the microprocessor controller, the controller being responsive to the sensed current signals to generate control signals to the control modules to equalize the current in each of the stator windings.

6. The electrical machine of claim 5, the microprocessor controller comparing each current sensing signal from each phase in the winding of each stator element to a predetermined fault threshold to detect a winding fault in a stator element, and cause the control module connected to that stator element to deenergize the stator element in response to the detected fault, permitting the motor to continue to operate.

7. The electrical machine of claim 1, the load sensing means comprising a motor speed sensor.

8. The electrical machine of claim 1, the load sensing means comprising a torque sensor.

9. The electrical machine of claim 1, the rotor angle position sensor comprising a rotary encoder.

10. The electrical machine of claim 1, wherein the electrical machine is used as a motor.

11. A method of operating an electrical machine in a fault tolerant manner in response to a controller, the electrical machine comprising: a housing, a stator mounted in the housing, and a rotor, the rotor having a shaft with an axis therethrough and being supported by bearings for rotation about the axis in the housing, the stator comprising:
a plurality of stator elements in the form of annular disks, spaced apart from each other, each stator element comprising a plurality of magnetically isolated magnetic teeth,
a plurality of electrical windings on each of the stator elements, each winding being associated with a group of magnetic teeth of the stator element, each group of magnetic teeth being arranged at a predetermined angular position with respect to an adjacent group of magnetic teeth,
each of the windings being arranged such that, when energized with a current flowing in the windings, a magnetic flux is created in a first direction;

the rotor comprising:
a plurality of rotor elements, the rotor elements being spaced from each other and interstitially disposed with the stator elements in an interdigitated manner;
each rotor element being in the form of a circular disk mounted on the shaft, each rotor element comprising a plurality of magnetically isolated magnetic teeth arranged in an annular portion of the circular disk;

means for completing a magnetic flux path in a second direction through the magnetic teeth of the rotor elements and through corresponding groups of teeth on successive stator elements;

a modular control unit arranged to individually control electrical energy applied to each winding of each stator element, the control unit comprising:

a microprocessor controller, a load sensing means, a rotor angle position sensor, and a plurality of stator control modules;

each stator control module comprising an electrical switching device connected to a winding of the respective stator element and current sensing means to sense current in each winding of the associated stator element and means to generate a corresponding signal to the microprocessor controller;

the microprocessor controller being responsive to the load sensing means, the rotor angle position sensor, and the signal representing the sensed winding current, to generate control signals to the control modules;

the microprocessor controller comparing each current signal to a predetermined fault threshold to detect a fault in a winding in a stator element and causing the corresponding control module to deenergize one or more windings in the stator element in response to the detected fault. thereby permitting the motor to continue to operate in the presence of a winding fault.

12. The method of claim 11, further comprising the microprocessor controller being responsive to the sensed current in the faulted winding to increase the current in the other windings of that stator element to compensate for the fault.

13. The method of claim 11, further comprising the microprocessor controller being responsive to the sensed current in the faulted winding to increase the current in the windings of other stator elements to compensate for the fault.

14. The method of claim 11, wherein at least two windings in a stator element are deenergized, the deenergized windings being symmetrically arranged on the stator element, so that torque produced by that stator element fluctuates in a symmetrical manner.

15. The method of claim 11, wherein one or more windings in a stator element not containing the faulted winding are deenergized, the deenergized windings being arranged on the unfaulted stator element rotationally symmetrical to the faulted winding on the faulted stator element, so that torque produced by the electrical machine remains substantially constant.

* * * * *